Figure 1:
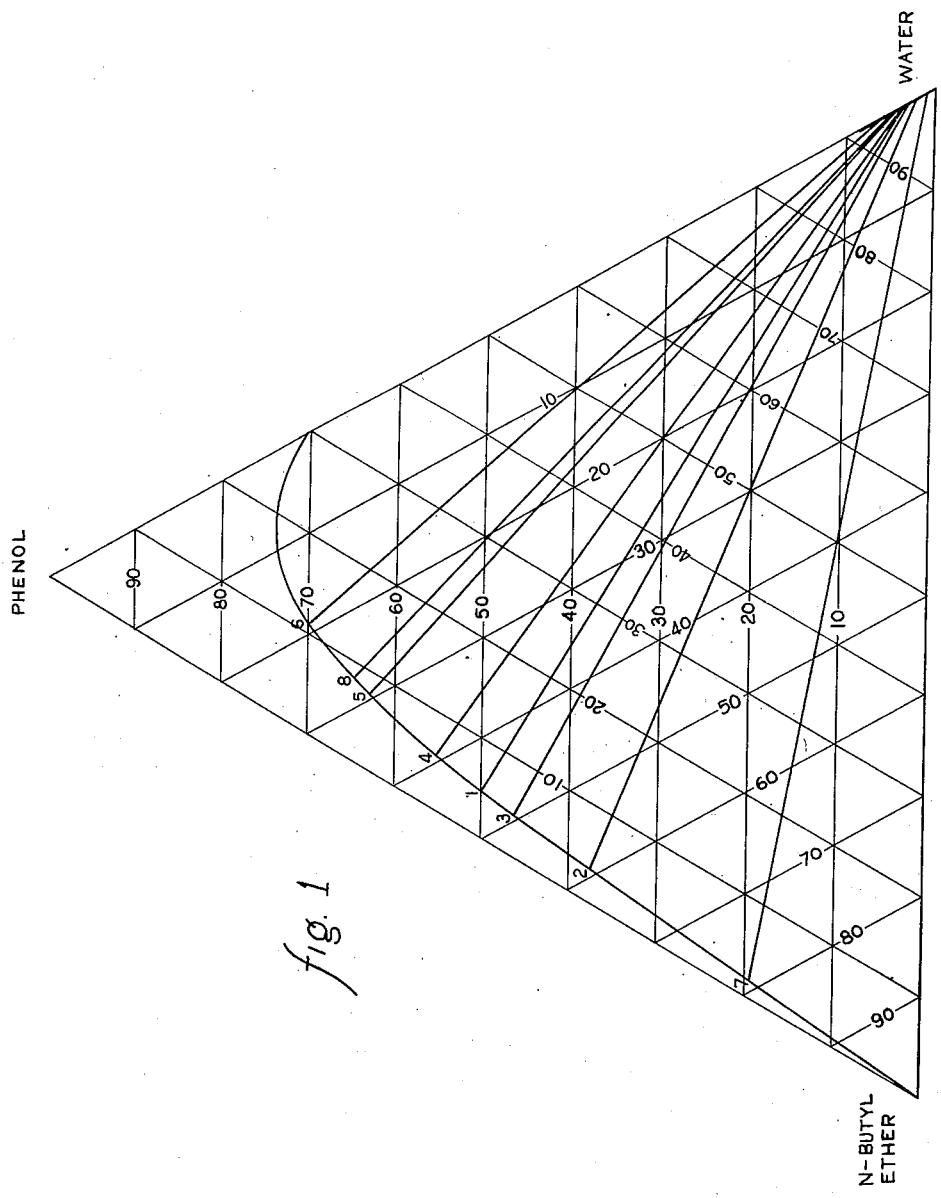

Oct. 7, 1952     W. G. JACKSON     2,613,171
TWO-PHASE THREE SOLVENT CONCENTRATION
OF ANTIPERNICIOUS ANEMIA FACTORS

Filed Feb. 25, 1950     3 Sheets-Sheet 1

Inventor
WILLIAM G. JACKSON
By
Dean Laurence
Attorney

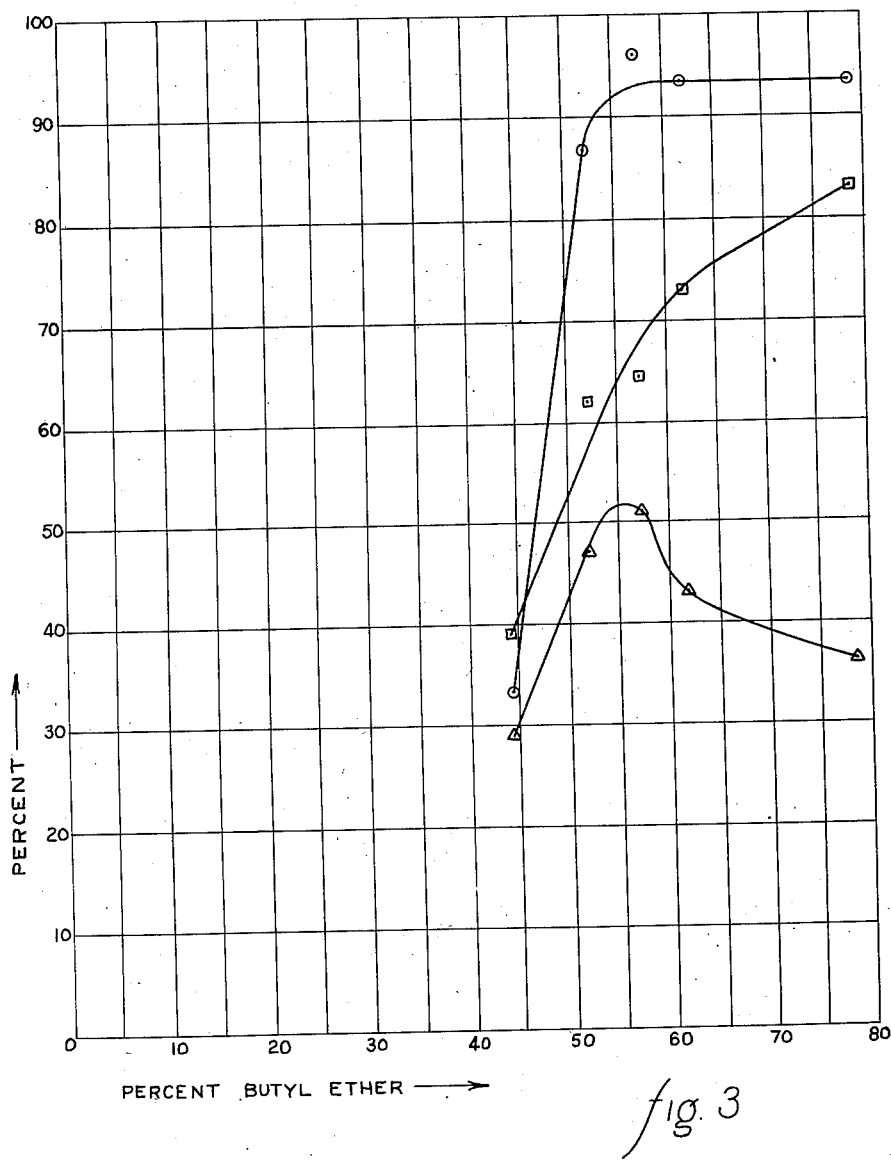

Patented Oct. 7, 1952

2,613,171

UNITED STATES PATENT OFFICE 2,613,171

TWO-PHASE THREE-SOLVENT CONCENTRATION OF ANTIPERNICIOUS ANEMIA FACTORS

William G. Jackson, Kalamazoo, Mich., assignor to The Upjohn Company, Kalamazoo, Mich., a corporation of Michigan Application February 25, 1950, Serial No. 146,337

3 Claims. (Cl. 167—81)

This invention relates to processes for the extraction and concentration of anti-pernicious anemia factors, and relates particularly to a partition or extraction process in which a two-phase system of three solvents is used.

The process of the present invention is based upon the discovery that there is an unusually favorable distribution of anti-pernicious anemia factors and impurities normally associated therewith between the upper and lower phases of certain two-phase ternary systems comprising a phenol, an ether, and water, which makes it possible to achieve greater purity in a single extraction than can be accomplished by the use of a phenol alone.

The presence of an anti-pernicious anemia factor or factors in various animal organs, particularly in liver, is well established. So-called "liver concentrates," which contain such factors, have wide usage in the treatment of pernicious (Addisonian) and macrocytic anemias of the pernicious anemia type with a megaloblastic bone marrow. The anti-pernicious anemia fraction of liver has been highly concentrated [Biochem. Journal (Proceedings) 1946, vol. 40, page iv; Nature, 1948, vol. 161, page 638; and Science, 1948, vol. 107, page 396]. Because the anti-pernicious anemia factor appears to be but a single chemical entity, it is herein designated, without regard to its source, as vitamin $B_{12}$; this entity may consist of or comprise other active related substances. In conformity with present practice, irrespective of whether this fraction that is known to be effective in combating pernicious anemia consists of one or more chemical entities, the term vitamin $B_{12}$ as used hereinafter designates those substances or fractions which are clinically effective in the treatment of pernicious anemia or Addisonian pernicious anemia.

In addition to its presence in liver, vitamin $B_{12}$ is associated with the mycelia of *Streptomyces griseus* and *Streptomyces fradiae* when cultured on certain artificial media and is also known to be present in appreciable amounts elsewhere, for example, in such packing-house wastes as hog, cattle and chicken faeces, and in the stomach contents of slaughtered animals. The anti-pernicious anemia factors present in these packing-house wastes are known and referred to as "animal protein factors." The processes of the present invention are applicable to the concentration of vitamin $B_{12}$ containing fractions from all such sources.

Processes by which vitamin $B_{12}$ may be concentrated have been described heretofore in the art with particular respect to liver as the source material. The preparation of an aqueous solution of the anti-pernicious anemia factor or vitamin $B_{12}$ is a step common to many of the known methods for the concentration of the vitamin $B_{12}$ activity. Whether the solution in water is obtained by extraction of whole liver to give a crude starting preparation, or whether it is obtained by extraction with organic solvents and recovered from the solvents by extraction with water or by precipitation at various stages of a purification procedure involving other steps, is of no consequence, it being necessary only that the vitamin $B_{12}$ be in aqueous solution. Such an aqueous solution or the paste or the dry solids obtained by the partial or complete removal of water therefrom, serves as the starting point for conventional procedures for the preparation of liver or vitamin $B_{12}$ concentrates, as described for example, by Laland and Klem, Acta Med. Scand. 1936, vol. 88, page 620 and United States Patents 2,134,256, 2,125,844, and 2,369,465. Although these and other procedures have produced useful liver concentrates, products containing vitamin $B_{12}$ at a purity of more than about 0.2 microgram (0.2 gamma or 0.0002 milligram) of vitamin $B_{12}$ activity per milligram of total solids, such products have not attained widespread use in anemia therapy. Vitamin $B_{12}$ has been obtained in much greater purity than this, but only after treatment by long and complicated purification procedures.

Simpler methods by which the content of vitamin $B_{12}$ of such preparations can be increased and the cost materially reduced are desirable. It is also desirable to have available a procedure by which vitamin $B_{12}$ present in a dilute aqueous solution can be easily extracted and obtained in the form of a concentrated solution having a greatly reduced volume. Some of the known procedures produce a more concentrated product when applied to crude materials but are of little value when applied to the concentration of more highly purified vitamin $B_{12}$-containing materials. A procedure which is effective when applied to concentration or purification of more highly purified vitamin $B_{12}$ preparations would also be useful. In order heretofore to produce highly purified vitamin $B_{12}$ preparations, it has been necessary to subject the crude preparation that has been highly concentrated to further action by mixed microorganisms as a means of removing impurities which hinder further purification, for example, as described in J. Biochem. Soc. (Proceedings) 1946, vol. 40, page iv. A procedure for obtaining a vitamin $B_{12}$ concentrate which can be converted readily to crystalline vitamin $B_{12}$ and which will avoid such treatments with microorganisms is also desirable.

The process of the present invention achieves all of these highly desirable results. It provides a simple method by which very crude preparations containing vitamin $B_{12}$ can be concentrated and purified to yield products having sufficient potency to be commercially useful. It is also useful in increasing the purity of vitamin $B_{12}$-containing products, from a product having, for example, approximately 3.0 to 5.0 micrograms (gammas) of vitamin $B_{12}$ per milligram of solids to a product having about 120 micrograms of vitamin $B_{12}$ per milligram of solids, a result which has not been accomplished heretofore in a single treatment. In addition, the process of this invention can be used to extract vitamin $B_{12}$ from the first dilute aqueous extracts obtained from liver, *S. griseus* mycelium, *S. fradiae* mycelium, and other source materials. The method of this invention can be applied with success to such dilute extracts or at other points in a series of steps for the concentration and purification of vitamin $B_{12}$.

The process of this invention comprises, as its first and essential step, intimately contacting a crude solid containing vitamin $B_{12}$, or an aqueous vitamin $B_{12}$-containing extract, with a selected two-phase phenol-ether-water ternary system. The mixture is allowed to separate and the upper phase of the ternary system, which consists of the ether and most of the phenol and contains a substantial proportion of the vitamin $B_{12}$ in a purified state, is withdrawn. The lower aqueous phase, which contains a smaller concentration of vitamin $B_{12}$, may be extracted with further quantities of the ether-phenol upper phase until it is no longer profitable to do so. An optional step at this point comprises intimately contacting the separated upper phase containing the purified vitamin $B_{12}$ with an additional quantity of fresh phenol-water lower phase. This step, while it removes some of the vitamin $B_{12}$ and thus reduces the initial yield, extracts a greater amount of impurity and leaves the vitamin $B_{12}$ remaining in the upper phase in a more highly purified condition. The second step in certain embodiments of the processes of this invention comprises the addition of a further quantity of an ether to the separated upper phase, as a result of which the solubility relationship which theretofore prevailed is reversed and the vitamin $B_{12}$ is selectively extracted into the aqueous lower phase in a further more highly purified condition.

Among the phenolic compounds suitable for use in the method of this invention are monohydric phenols such as phenol (carbolic acid), the cresols (ortho-, meta-, and para-cresol and mixtures thereof), xylenols, purified phenolic coal-tar fractions, and the like. The aliphatic ethers which can be used in conjunction with the phenols are water-immiscible aliphatic ethers such as diethyl ether, dipropyl ether, diisopropyl ether, dibutyl ethers, diamyl ethers, and the like. In general, lower aliphatic ethers which are good solvents for phenol and are water-immiscible are preferred (dimethyl ether is accordingly unsuitable); these ethers are not themselves solvents for vitamin $B_{12}$.

Although the ratios of the specific phenolic compound to the specific ether may be varied within wide ranges, the ratios should be controlled as specified hereinafter in order to obtain the maximum effectiveness of the method of this invention. To illustrate these variations, a detailed description of the variation of concentrations is set forth hereinafter for the two-phase ternary system of phenol-dibutyl ether-water. It is to be understood that such data can be obtained in like manner for other systems using other ethers and other phenolic compounds; these data will vary only in degree dependent upon the particular combination which is selected.

Phenol and water are partially miscible, the intimate contact of phenol and water in certain proportions giving a two-phase binary system the composition of whose upper and lower phases at various temperatures is well known (see International Critical Tables, McGraw-Hill Book Company, New York, 1928, vol. III, page 389). When an ether or a mixture of ethers is added to the phenol-water system, a ternary two-phase system is formed, the upper phase of which is predominantly ether and contains most of the phenol and the lower phase of which is a dilute aqueous solution of phenol containing a small proportion of dissolved ether. Figure 1 of the accompanying drawings is a phase diagram of the ternary system: phenol-dibutyl ether-water, as determined by the method of Othmer et al., Ind. Eng. Chem. 1941, vol. 33, pages 1240–8. By means of such phase diagram the composition of the two phases may be readily ascertained by determination of the percentage of one component of either layer of the system; from this value the respective percentages of the remaining components in both the upper and lower phases can be read from the diagram. Thus, by determining the percentage of butyl ether in the upper phase and fixing this value on the left curve of Figure 1, the percentages of phenol and water which coexist at equilibrium with this percentage of butyl ether in the upper phase can be read directly. The curves for other ethers have the same general shape, the specific differences being due principally to the different solubility in water of the particular ether.

Figure 2:
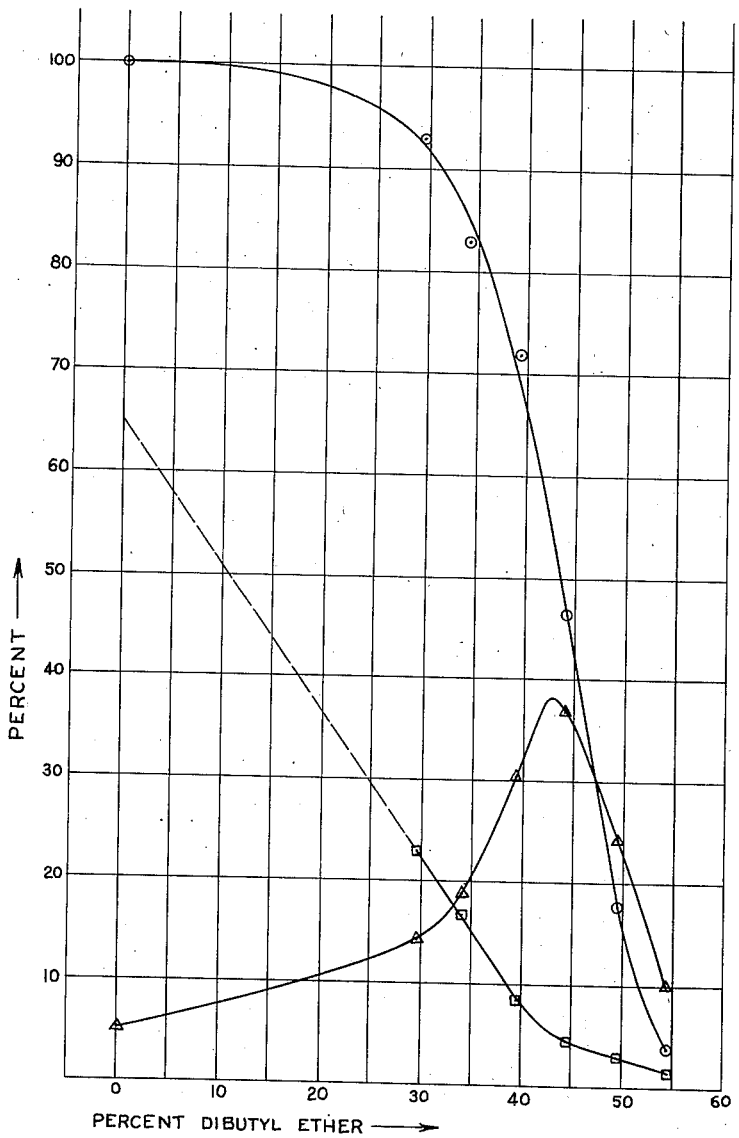

Figure 2 of the accompanying drawings shows an example of the purification and percentage yields obtainable by the use of various two-phase ternary phenol-dibutyl ether-water compositions, plotted in terms of percent dibutyl ether. This illustrates the selective extraction of vitamin $B_{12}$ from water by phenol-dibutyl ether solutions, which is the first step of the present invention, and clearly shows that, in concentrations between about 30 and about 55 percent butyl ether, an improved purification of vitamin $B_{12}$ is obtained when compared with the use of phenol alone.

Figure 3 of the accompanying drawings illustrates both the optional step of back-washing the phenol-water extract and the second step in the process, which consists of the addition of a further quantity of fresh dibutyl ether, whereby the vitamin $B_{12}$ becomes more soluble in the lower than in the upper phase. The upper phase shown in Figure 3 having about 44.2 percent butyl ether corresponds to the upper phase giving about the maximum purification as shown in Figure 2. Figure 3 also shows that, when a solution of vitamin $B_{12}$ in a dibutyl ether-phenol-water ternary system having the composition represented by 44.2 percent dibutyl ether is washed with fresh lower phase, or water, some vitamin $B_{12}$ of reduced purity goes into the lower phase. This also signifies that the vitamin $B_{12}$ remaining in the upper butyl ether phase is purified by this washing. As the concentration of dibutyl ether in the upper phase is increased to about 46 percent, or above, the purity of the vitamin $B_{12}$ extracted into fresh lower phase is equal to or greater than that originally present in the upper phase. The maximum increase in purity achieved by this step takes place at a dibutyl ether concentration between approximately 51 and 55 percent. At these dibutyl ether concentrations, a recovery of about 87 percent of vitamin $B_{12}$ is accomplished with a single extraction. When the ether concentration is increased to about 75 to 80 percent, the purity of the vitamin $B_{12}$ that is obtained is appreciably less than that obtained in the specified intermediate range.

Other two-phase ternary systems consisting of phenol, water, and a water-insoluble alcohol, ketone, ester or halogenated hydrocarbon (such as chloroform) are not suitable for use in the process of this invention. In the intermediate concentrations of these latter solvent components, these systems dissolve equally well both the vitamin $B_{12}$ and the organic impurities normally associated therewith, while at higher concentrations they either prevent the solution of the vitamin $B_{12}$ in the upper phase, resembling the ethers in this respect, or possess no selective solubility for the vitamin $B_{12}$.

Typical processes embodying my invention are illustrated in the examples which follow, and these examples are to be understood not to be restrictive of the invention, which is to be limited solely by the scope of the appended claims.

EXAMPLE 1

*Streptomyces griseus* was cultured on a suitable artificial medium for the production of vitamin $B_{12}$. The pH of the culture medium was adjusted to about 5.3 with sulfuric acid and the mycelial mass was separated therefrom by filtration. The mycelium thus obtained was heated with water and filtered. To a three-liter aliquot of this filtrate, which assayed 1700 micrograms (1 microgram=1 gamma=0.001 milligram) of vitamin $B_{12}$ and 48 grams of solids (purity of vitamin $B_{12}$ 0.035 microgram per milligram of solid), there was added 345 milliliters of a 75 percent by weight phenol-water solution (270 grams of phenol). The solution was extracted with the ternary system resulting from the addition of 150 milliliters of 75 percent aqueous phenol (117 grams of phenol) and 150 milliliters (112.6 grams) of dibutyl ether. The phenol-butyl ether-water upper phase (volume 360 milliliters, composition 30 percent dibutyl ether, 62.5 percent phenol, 7.5 percent water) was separated. An assay, which was high due to an experimental error, indicated that this upper phase contained about 1800 micrograms of vitamin $B_{12}$ and 828 milligrams of solids. The lower phase (volume 3300 milliliters), which contained about 270 micrograms of vitamin $B_{12}$, was extracted with the ternary system resulting from the addition of 100 milliliters (75.1 grams) of dibutyl ether and 100 milliliters of a 75 percent aqueous phenol solution (phenol 78 grams). The upper phase (volume 185 milliliters), having a composition of approximately 50 percent butyl ether, 46 percent phenol, 4 percent water, contained about 5 micrograms of vitamin $B_{12}$ and 74 milligrams of solids. The spent lower phase contained less than 83 micrograms of vitamin $B_{12}$ and was discarded.

The vitamin $B_{12}$ was extracted from a 95 percent aliquot (volume 518 milliliters) of the combined dibutyl ether upper phases from the above two extractions by the addition of 260 milliliters (195 grams) of dibutyl ether (resulting composition about 52 percent butyl ether, 44 percent phenol and 4 percent water) and extraction with 50 milliliters of water. The aqueous extract contained 600 micrograms of vitamin $B_{12}$ and 378 milligrams of solids, a purity of 1.6 micrograms of vitamin $B_{12}$ per milligram of solids. The phenol-dibutyl ether upper phase was again extracted with 50 milliliters of water, the lower phase containing 210 micrograms of vitamin $B_{12}$ at a purity of 3.1 micrograms per milligram of solids.

The phenol-butyl ether phase had now reached a volume of 760 milliliters and contained 506 micrograms of vitamin $B_{12}$ at a purity of 1.1 micrograms per milligram of solids. An additional 150 milliliters (113 grams) of dibutyl ether was added, the upper phenol-dibutyl ether ternary phase now containing about 60 percent butyl ether, 37 percent phenol and 3 percent water. This solution was intimately mixed with 50 milliliters of water, the phases separated, the lower phase containing about 180 micrograms of vitamin $B_{12}$ at a purity of about 3.5 micrograms per milligram of solids. The spent phenol-butyl ether upper phase, which contained less than 110 micrograms of vitamin $B_{12}$ and 402 milligrams of solids, was discarded.

A ninety percent aliquot of the first two lower-phase extracts (101 milliliters containing 729 micrograms of vitamin $B_{12}$ at a purity of 1.8 micrograms per milligram of solids) was extracted with ten milliliters of 75 percent aqueous phenol solution. The aqueous upper phase contained less than 29 micrograms of vitamin $B_{12}$ and 172 milligrams of solids. To the lower phenol phase (volume 4.5 milliliters) there was added 15 milliliters (3 volumes or 11.25 grams) of dibutyl ether. The phenol-butyl ether upper phase thus formed contained about 77 percent butyl ether. The lower aqueous phase amounting to about one milliliter was separated and to it was added 19 volumes of acetone. The brown solid which precipitated was collected and, after drying under reduced pressure, weighed 129 milligrams and contained 278 micrograms of vitamin $B_{12}$, a purity of 2.15 micrograms of vitamin $B_{12}$ per milligram of solids.

EXAMPLE 2

A ternary mixture of 4.0 milliliters of 75 percent aqueous phenol solution and 3.5 milliliters of dibutyl ether was used to extract 5 milliliters of a water solution of vitamin $B_{12}$ containing 175 micrograms of vitamin $B_{12}$ at a purity of 0.33 microgram of vitamin $B_{12}$ per milligram of solids. The upper layer of the resulting ternary mixture (volume 6.3 milliliters) had a composition of 50 percent phenol, 45.5 percent butyl ether and 4.5 percent water and is indicated as point I on the curve of Figure 1. The lower aqueous phase was again extracted with three milliliters of the upper water-phenol-butyl ether phase containing 45.5 percent dibutyl ether as before. The combined upper layers (volume 9.3 milliliters) were washed with 3 milliliters of 3.55 percent aqueous phenol. This water-phenol solution is the composition which in Figure 1 is shown to be in equilibrium with upper phase of a composition indicated at point I. To the washed phenol-dibutyl ether upper phase above (volume 9.0 milliliters) there was added 4.5 milliliters (0.5 volume) of dibutyl ether, which changed the dibutyl ether concentration in the upper layer to about 64 percent. This solution was extracted with 0.45 milliliter of water, an aqueous layer of 0.6 milliliter separating. The aqueous layer was removed and to it was added 12 milliliters of acetone. The precipitate which formed was collected and, upon drying, weighed 3.4 milligrams and contained 74 micrograms of vitamin $B_{12}$, corresponding to a purity of 22 micrograms per milligram.

EXAMPLE 3

A diatomaceous earth filter cake weighing 225 grams and containing 660,000 micrograms of vitamin $B_{12}$ having a purity of 5.3 micrograms per milligram of water-soluble solids was divided into portions weighing 6.5 and 218.5 grams, respectively, for further purification.

Method A.—Phenol extraction—Prior art procedure

The 6.5-gram portion of filter cake, containing a total of 19,000 micrograms of vitamin $B_{12}$, at a purity of 5.3 micrograms per milligram of water-soluble solids, was extracted with 34 milliliters of a 3.55 percent solution of phenol in water, the vitamin $B_{12}$ being completely extracted into the solvent. This solution was extracted with 7 milliliters of a 75 percent aqueous phenol solution. The lower layer (volume 10 milliliters) was separated and to it was added 40 milliliters (30.0 grams) of dibutyl ether, the resulting ternary solution having the approximate composition of 80.8 percent butyl ether, 17.6 percent phenol and 1.6 percent water. This solution was extracted with 3.0 milliliters of water, and the aqueous layer separated and washed with 10 milliliters of dibutyl ether to remove the residual phenol. The dark red aqueous solution thus obtained contained 18,600 micrograms of vitamin $B_{12}$ having a purity of 7.5 micrograms per milligram of solids.

Method B.—Butyl ether-phenol procedure

The 218.5-gram portion above, containing 97.85 grams diatomaceous earth, 120.65 grams of water-soluble impurities and 641,000 micrograms of vitamin $B_{12}$ at a purity of 5.3 micrograms per milligram of water-soluble solids, was agitated with a ternary mixture consisting of 760 milliliters of water, 608 milliliters of 75 percent aqueous phenol solution and 532 milliliters of dibutyl ether. The solution separated into two layers, the upper phase (volume 600 milliliters) having the composition shown by point 1 in Figure 1, namely, butyl ether 45.3 percent, phenol 50.0 percent, and water 4.7 percent. The lower phase contained a trace of butyl ether, phenol 3.55 percent, and water 96.45 percent. The lower phase and filter cake were further extracted respectively with fresh 1.0, 1.5, 1.5 and 1.5-liter portions of the composition described above for point 1, Figure 1. The dibutyl ether-phenol-water upper phases were combined to give a total volume of 6.1 liters which contained 455,000 micrograms of vitamin $B_{12}$ and 10.5 grams of solids; the vitamin $B_{12}$ corresponds to a purity of 43 micrograms per milligram of solids.

A 95 percent aliquot of the combined upper phases (volume 5.8 liters) was washed twice with 1.4-liter quantities of 3.55 percent phenol (fresh lower phase). This wash solution was extracted with 1.4 and 0.7-liter portions of fresh upper phase as above. The dibutyl ether-phenol upper phases were combined (volume 7.5 liters) and contained, as shown by assay, 368,000 micrograms of vitamin $B_{12}$ having a purity of 123 micrograms per milligram of solids.

To the above 7.5 liters of combined upper phases was added 3.75 liters of dibutyl ether (2806 grams). The resulting upper phase, containing about 64.0 percent butyl ether, 33.0 percent phenol, and 3.0 percent water, was extracted with 450 and 350-milliliter portions of water. For the purpose of reducing the volume of solution, the combined aqueous extracts were extracted with 160 milliliters of 75 percent aqueous phenol solution and the aqueous residue discarded. Four hundred eighty (480) milliliters of dibutyl ether was added to the phenol extract and the syrupy aqueous layer which separated was collected. Six hundred (600) milliliters of acetone was added to the syrup and the solid material which precipitated was collected, dried, weighed and assayed. There was thus collected 2.1 grams of solid material containing 264,000 micrograms of vitamin $B_{12}$ having a purity of 120 micrograms per milligram.

EXAMPLE 4.—PREPARATION OF FIGURE 2

A pink dry solid containing 3.1 micrograms of vitamin $B_{12}$ per milligram was dissolved in 3.55 percent aqueous phenol solution to give a solution containing 146 micrograms of vitamin $B_{12}$ per milliliter.

Five-milliliter portions of this solution were mixed with 5-milliliter portions of a ternary solution prepared by mixing dibutyl ether and 75 percent phenol in the proportions shown in the following Table I. The dibutyl ether-phenol-water upper phase was separated and assayed. The percent of vitamin $B_{12}$, percent of total solids extracted, and the purity of the vitamin $B_{12}$ contained therein, are as given in Table I.

Table I also shows the composition of the upper or extracting phase and its location on the curve given in Figure 1.

*Table I*

| | | | | | | | | | |
|---|---|---|---|---|---|---|---|---|---|
| Composition of Ternary System: | | | | | | | | | |
| Vol. 75% Phenol | 1.0 | 0.8 | 0.7 | 0.65 | 0.6 | 0.55 | 0.5 | 0.45 | 0.4 |
| Vol. Bu. Ether | 0.0 | 0.2 | 0.3 | 0.35 | 0.4 | 0.45 | 0.5 | 0.55 | 0.6 |
| Vol. Vitamin $B_{12}$ Solution | 1.0 | 1.0 | 1.0 | 1.0 | 1.0 | 1.0 | 1.0 | 1.0 | 1.0 |
| Composition of Upper Layer: | | | | | | | | | |
| Butyl Ether, percent | 0.0 | 19.1 | 29.6 | 34.2 | 39.4 | 44.2 | 49.5 | 54.4 | 59.1 |
| Phenol, percent | 71.0 | 69.9 | 62.8 | 59.2 | 55.0 | 51.0 | 46.2 | 41.9 | 37.6 |
| Water, Percent | 29.0 | 11.0 | 7.6 | 6.6 | 5.6 | 4.8 | 4.3 | 3.7 | 3.4 |
| Point on Figure 1 | | 6 | 5 | | 4 | | 3 | | 2 |
| Vitamin $B_{12}$ Recovery: | | | | | | | | | |
| Extraction, percent | 100.0 | | 93.0 | 83.0 | 72.0 | 46.5 | 13.0 | 4.0 | |
| Purity, mcg./mg | 5.05 | | 14.5 | 19.0 | 30.5 | 37.0 | 24.5 | 10.0 | |

EXAMPLE 5.—DIETHYL ETHER

Four grams of crude vitamin $B_{12}$ containing 0.3 microgram per milligram of solids was treated with the ternary solution resulting from 19.0 grams of phenol, 6.4 grams of water and 8.5 grams of diethyl ether. The upper organic phase which separated contained 31 percent of the original solids and 79 percent of the vitamin $B_{12}$. An additional 8.5 grams of diethyl ether was added to the separated upper phase and the water layer which formed was separated. There was thus obtained 46 percent of the original vitamin $B_{12}$ at a purity of 0.8 microgram per milligram.

EXAMPLE 6.—EXTRACTION FROM DIBUTYL ETHER-PHENOL WITH WATER—FIGURE 3.

Forty milliliters of an aqueous solution of vitamin $B_{12}$ was extracted with an equal volume of the upper phase of a dibutyl ether-phenol-water ternary composition containing 44.2 percent dibutyl ether. This extraction was repeated with two additional 30- and 31-milliliter portions of the same upper phase. The combined dibutyl ether layers (volume 91 milliliters) contained 80 percent of the vitamin $B_{12}$ present in the original aqueous solution at a purity of 34 micrograms per milligram.

Five portions of the above extract, each consisting of ten milliliters, were taken and to them were added 0, 2.0, 4.0, 5.6 and 20.0 milliliters, respectively, of dibutyl ether. Each portion was then extracted with 10 milliliters of water. The following table gives the percent dibutyl ether in each resulting upper phase, from which, by the use of Figure 1, the total composition of both the upper and lower phases can be determined. Table II gives also the purity of the vitamin $B_{12}$ in the aqueous lower phase and the percent of the vitamin removed with a single extraction.

*Table II*

| | | | | | |
|---|---|---|---|---|---|
| Percent Butyl Ether | 44.2 | 52.0 | 57.8 | 61.7 | 78.8 |
| Percent Extraction | 33.5 | 86.5 | 96.5 | 93.5 | 93.5 |
| Purity, mcg./mg | 29.0 | 47.0 | 51.0 | 43.0 | 36.5 |

It is to be noted that, when the original solution, to which no additional dibutyl ether was added, was extracted with water, the purity of the vitamin $B_{12}$ in the water layer was lower than that of the starting material. The purity of the vitamin $B_{12}$ remaining in the dibutyl ether layer is accordingly higher than in the original solution, an additional purification of this portion of the vitamin $B_{12}$ having been accomplished.

EXAMPLE 7

Forty (40) milliliters of an aqueous solution containing 30,000 micrograms of vitamin $B_{12}$ and 272 milligrams of solids, which corresponds to a purity of 110 micrograms per milligram, was stirred with four milliliters of 75 percent aqueous phenol solution and 1.2 milliliters of dibutyl ether. The upper organic layer consisting of three milliliters was separated and found to assay 22,000 micrograms of vitamin $B_{12}$ and 48 milligrams of solids. This recovery corresponds to a yield of 73 per cent and the purity of the product to 458 micrograms of vitamin $B_{12}$ per milligram.

Further extraction of the lower aqueous layer with a mixture of three milliliters of 75 percent aqueous phenol solution in one milliliter of dibutyl ether afforded an upper layer containing 8080 micrograms of vitamin $B_{12}$ and 76 milligrams of solid, which corresponds to a recovery yield of 27 percent and a purity of 106 micrograms of vitamin $B_{12}$ per milligram of solids.

Inasmuch as the foregoing specification comprises preferred embodiments of the invention, it is to be understood that the invention is not limited thereto, and that variations and modifications may be made in conventional manner without departing from the scope of the invention as defined in the appended claims.

I claim:

1. A process for purifying anti-pernicious anemia factors whereby a material containing not more than 5.0 micrograms of vitamin $B_{12}$ activity per milligram of solids may be purified to a product having a purity in excess of approximately 120 micrograms of vitamin $B_{12}$ activity per milligram of solids, which comprises: intimately distributing a material containing anti-pernicious anemia factors throughout a 2-phase ternary solvent system consisting of water, phenol, and dibutyl ether, said system having a concentration of dibutyl ether in the upper phase between about 30 and about 55 percent, separating the two phases, and thereafter recovering purified anti-pernicious anemia factors from the separated upper phase.

2. A process for purifying anti-pernicious anemia factors whereby a material containing not more than 5.0 micrograms of vitamin $B_{12}$ activity per milligram of solids may be purified to a product having a purity in excess of approximately 120 micrograms of vitamin $B_{12}$ activity per milligram of solids, which comprises: intimately distributing a material containing anti-pernicious anemia factors throughout a 2-phase ternary solvent system consisting of water, phenol, and dibutyl ether, said system having a concentration of dibutyl ether in the upper phase between about 30 and about 55 percent, separating the two phases, diluting the separated upper phase with dibutyl ether in a sufficient added quantity to render the anti-pernicious anemia factors preferentially soluble in an aqueous lower phase, intimately contacting the new dibutyl ether-containing upper phase solution with an additional quantity of water, separating the phases, and recovering the purified anti-pernicious anemia factors from the lower aqueous phase.

3. A process for purifying anti-pernicious anemia factors whereby a material containing not more than 5.0 micrograms of vitamin $B_{12}$ activity per milligram of solids may be purified to a product having a purity in excess of approximately 120 micrograms of vitamin $B_{12}$ activity per milligram of solids, which comprises: intimately distributing a material containing anti-pernicious anemia factors throughout a 2-phase ternary solvent system consisting of water, phenol, and dibutyl ether, said system having a concentration of dibutyl ether in the upper phase between about 30 and about 55 percent, separating the two phases, adding water to the separated upper phase, diluting the new ternary system with sufficient dibutyl ether to render the anti-pernicious anemia factors preferentially soluble in the lower aqueous phase, separating the resulting phases, and recovering purified anti-pernicious anemia factors from the lower aqueous phase.

WILLIAM G. JACKSON.

REFERENCES CITED

The following references are of record in the file of this patent:

UNITED STATES PATENTS

| Number | Name | Date |
|---|---|---|
| 2,134,256 | Laland | Oct. 25, 1938 |

OTHER REFERENCES

Emery, Proceedings of the Biochemical Society in the Biochemical Journal, volume 40 (1946), page IV, 167–81$B_{12}$.

Vitamins and Hormones, volume 3 (1945), page 263. (Copy in Division 43.)